(12) United States Patent
Mayer et al.

(10) Patent No.: US 8,516,898 B2
(45) Date of Patent: Aug. 27, 2013

(54) AIRCRAFT SLAT DISCONNECT SENSOR

(75) Inventors: Timothy Michael Mayer, Belvidere, IL (US); Paul F. Hastings, Rockford, IL (US); Dale W. Massolle, Jr., Davis Junction, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 411 days.

(21) Appl. No.: 12/890,769

(22) Filed: Sep. 27, 2010

(65) Prior Publication Data

US 2011/0234237 A1    Sep. 29, 2011

Related U.S. Application Data

(60) Provisional application No. 61/317,008, filed on Mar. 24, 2010.

(51) Int. Cl.
    *G01L 1/00*   (2006.01)
(52) U.S. Cl.
    USPC ............. 73/783; 73/755; 340/686.1; 340/687
(58) Field of Classification Search
    USPC .................................................. 73/783, 855
    See application file for complete search history.

(56) References Cited

U.S. PATENT DOCUMENTS

| | | | |
|---|---|---|---|
| 4,606,590 A * | 8/1986 | Kauffmann et al. | ......... 439/218 |
| 4,608,548 A * | 8/1986 | Borzoni | ....................... 337/201 |
| 4,838,503 A | 6/1989 | Williams | |
| 5,144,851 A | 9/1992 | Grimm et al. | |
| 5,209,429 A | 5/1993 | Doolin et al. | |
| 5,628,477 A | 5/1997 | Caferro et al. | |
| 5,680,124 A | 10/1997 | Bedell et al. | |
| 5,686,907 A | 11/1997 | Bedell et al. | |
| 5,743,490 A | 4/1998 | Gillingham et al. | |
| 5,950,774 A | 9/1999 | Lang et al. | |
| 6,007,267 A * | 12/1999 | VanHorn | ........................... 403/2 |
| 6,299,108 B1 | 10/2001 | Lindstrom et al. | |
| 6,376,786 B1 * | 4/2002 | Ishibashi | .................... 200/61.62 |
| 6,466,141 B1 * | 10/2002 | McKay et al. | ................ 340/963 |
| 6,483,436 B1 | 11/2002 | Emaci et al. | |
| 6,488,434 B1 * | 12/2002 | Graeff | ............................. 403/2 |
| 6,804,856 B2 | 10/2004 | Udall | |
| 6,860,452 B2 | 3/2005 | Bacon et al. | |

(Continued)

FOREIGN PATENT DOCUMENTS

| | | |
|---|---|---|
| JP | 5305609 | 11/1993 |
| JP | 2001101468 | 4/2001 |
| JP | 2005147712 | 6/2005 |

*Primary Examiner* — Freddie Kirkland, III
(74) *Attorney, Agent, or Firm* — Carlson, Gaskey & Olds, P.C.

(57) ABSTRACT

A slat disconnect sensor includes a base. First and second arms are spaced apart from one another and are operatively supported by the base. At least one of the first and second arms have an end mounted to the base and is rotatable relative thereto at a pivot between connect and disconnect conditions. A mechanical link includes first and second link portions respectively secured to the first and second arms. The link interconnects the first and second arms and includes a weakened area providing a frangible connection in the connect condition and is configured to break at the frangible connection in the disconnect condition. A fuse includes first and second fuse portions operatively mounted to the first and second arms. The fuse is interconnected between the first and second arms providing continuity in the connected condition, and continuity is broken between the first and second portions in the disconnect condition.

14 Claims, 11 Drawing Sheets

(56) References Cited

U.S. PATENT DOCUMENTS

| | | |
|---|---|---|
| 7,051,975 B2 | 5/2006 | Pohl et al. |
| 7,059,182 B1 * | 6/2006 | Ragner ............................ 73/200 |
| 7,354,022 B2 * | 4/2008 | Richter et al. ................. 244/194 |
| 7,375,645 B2 * | 5/2008 | Tsai .............................. 340/665 |
| 7,402,045 B2 | 7/2008 | Schwartzbart et al. |
| 7,610,828 B2 | 11/2009 | Wingett et al. |
| 7,614,482 B2 | 11/2009 | Shikai et al. |
| 7,775,817 B2 | 8/2010 | Cain et al. |
| 7,921,729 B2 * | 4/2011 | Conner et al. ................... 73/783 |
| 2002/0171556 A1 * | 11/2002 | Emaci et al. ................ 340/686.2 |
| 2006/0229055 A1 * | 10/2006 | Tsai ............................... 455/403 |
| 2007/0080261 A1 | 4/2007 | Neumann et al. |
| 2007/0145180 A1 | 6/2007 | Johnson et al. |
| 2009/0223791 A1 | 9/2009 | Conner et al. |
| 2010/0038493 A1 | 2/2010 | Lang et al. |
| 2011/0027007 A1 * | 2/2011 | Tunno et al. ....................... 403/2 |
| 2011/0148201 A1 * | 6/2011 | Chuang ............................ 307/43 |

* cited by examiner

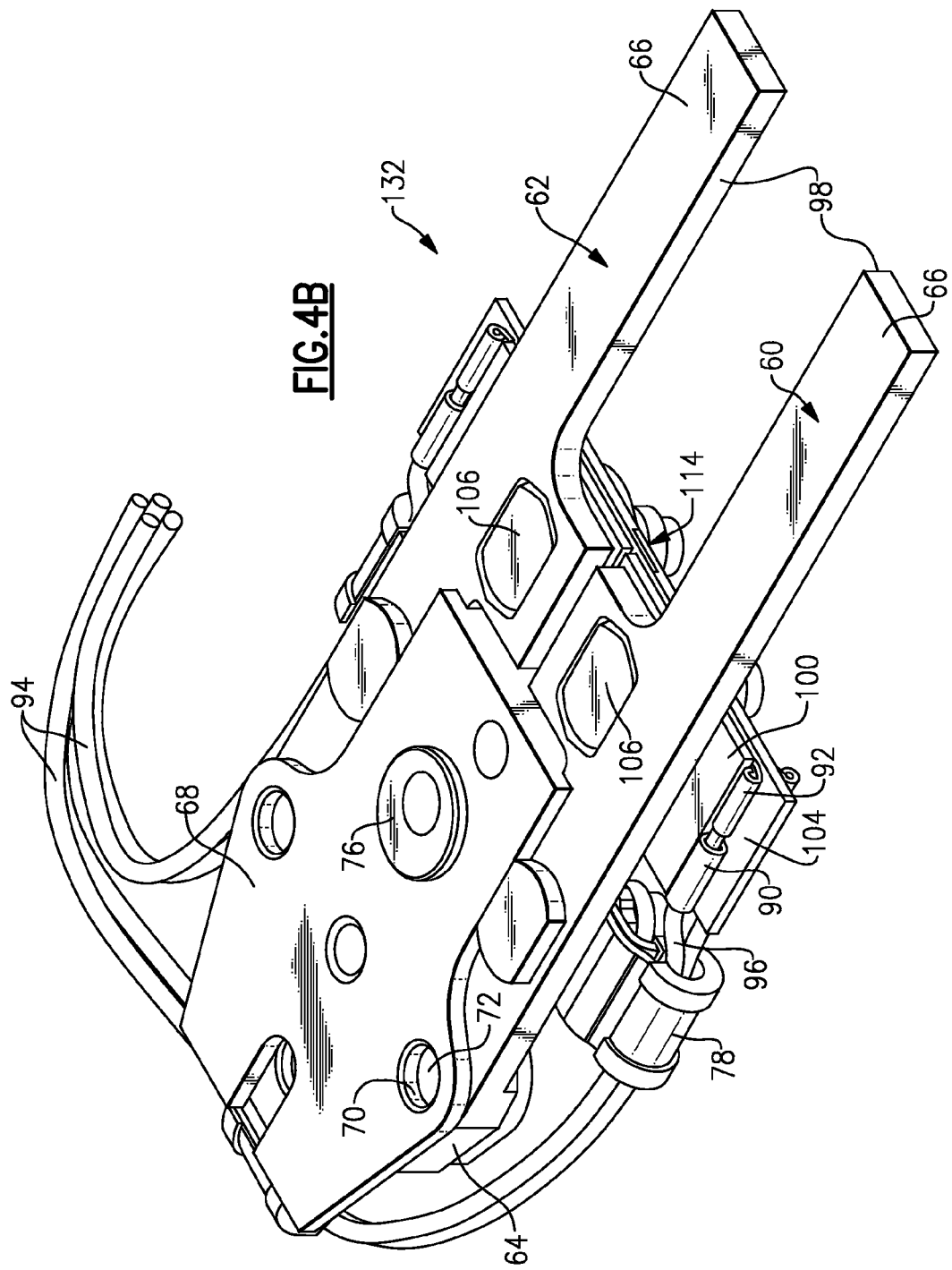

AIRCRAFT SLAT DISCONNECT SENSOR

This application claims priority to U.S. Application No. 61/317,008, filed on Mar. 24, 2010.

BACKGROUND

This disclosure relates to a slat disconnect sensor for use in aircraft airfoil applications.

The underside of a prior art slat 16 with a disconnect sensor 32 is shown in FIG. 1, and which is also described in U.S. Pat. No. 6,483,436. The disconnect sensor 32 includes first and second arms 36, 38 that straddle a striker pin 34 provided on one of the slat sections 28. The first and second arms 36, 38 are supported for pivotal movement about pivots 42 and are supported on a bracket 40 mounted to one of the slat sections 28. A spring 44 is provided between the first and second arms 36, 38 to bias the arms apart from one another during the disconnect condition.

A disconnect condition occurs when the adjoining slat sections 28 move relative to one another causing the striker pin 34 to engage and apply a load to one of the first and second arms 36, 38. A mechanical link 46 includes opposing ends secured to each of the first and second arms 36, 38 by fasteners 48. When a sufficient amount of force has been applied by the striker pin 34 to one of the first and second arms 36, 38, the mechanical link 46 will fracture at a weakened area along the mechanical link 46, enabling the first and second arms 36 38 to move apart from one another about their respective pivots 42. The spring 44 keeps the first and second arms 36, 38 apart from one another when the mechanical link 46 has broken.

In the example shown, the first arm 36 supports a magnet 50 that is adjacent to an end 52 of the second arm 38. The end 52 supports a sensor 54, such as a Reed switch, that acts as a proximity sensor to detect the proximity of the magnet 50. During the disconnect condition, the magnet 50 moves out of alignment with the sensor 54, which sends a signal via wires 56 connected to a controller via a harness 58 to indicate that the slat sections 28 have moved undesirably relative to one another, indicating a failure in the airfoil surface control system 12.

SUMMARY

A slat disconnect sensor includes a base. First and second arms are spaced apart from one another and are operatively supported by the base. At least one of the first and second arms have an end mounted to the base and is rotatable relative thereto at a pivot between connect and disconnect conditions. A mechanical link includes first and second link portions respectively secured to the first and second arms. The link interconnects the first and second arms and includes a weakened area providing a frangible connection in the connect condition and is configured to break at the frangible connection in the disconnect condition. A fuse includes first and second fuse portions operatively mounted to the first and second arms. The fuse is interconnected between the first and second arms to provide continuity in the connected condition, and continuity is broken between the first and second portions in the disconnect condition.

In one example, the mechanical link and the fuse are the same, and the fuse is insulated from the first and second arms. In another example, the mechanical link and fuse are different from one another and spaced apart along from one another on the arms.

BRIEF DESCRIPTION OF THE DRAWINGS

The disclosure can be further understood by reference to the following detailed description when considered in connection with the accompanying drawings wherein:

FIGS. 4A and 4B are perspective top and bottom views, respectively, of a first slat disconnect sensor.

DETAILED DESCRIPTION

Figure 1:
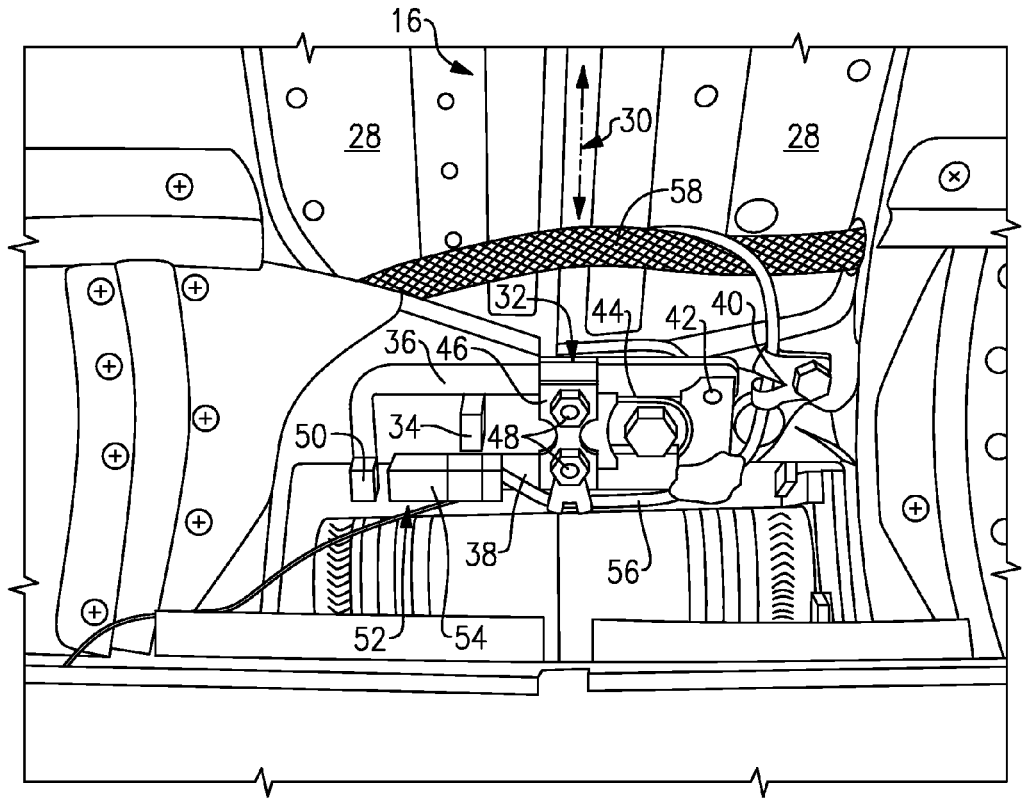
FIG. 1 is a schematic view of a prior art slat disconnect system.
Figure 4A:
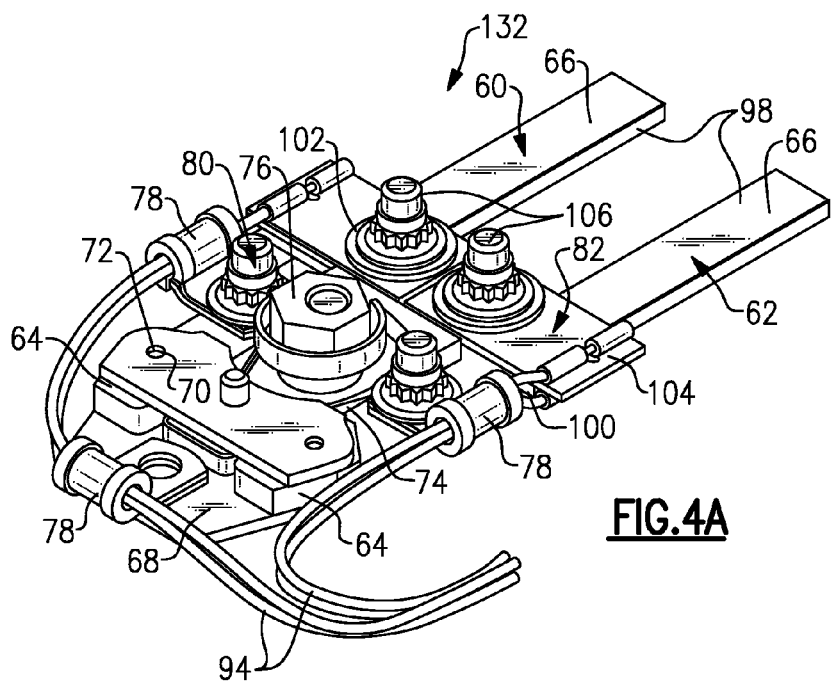
Figure 2:
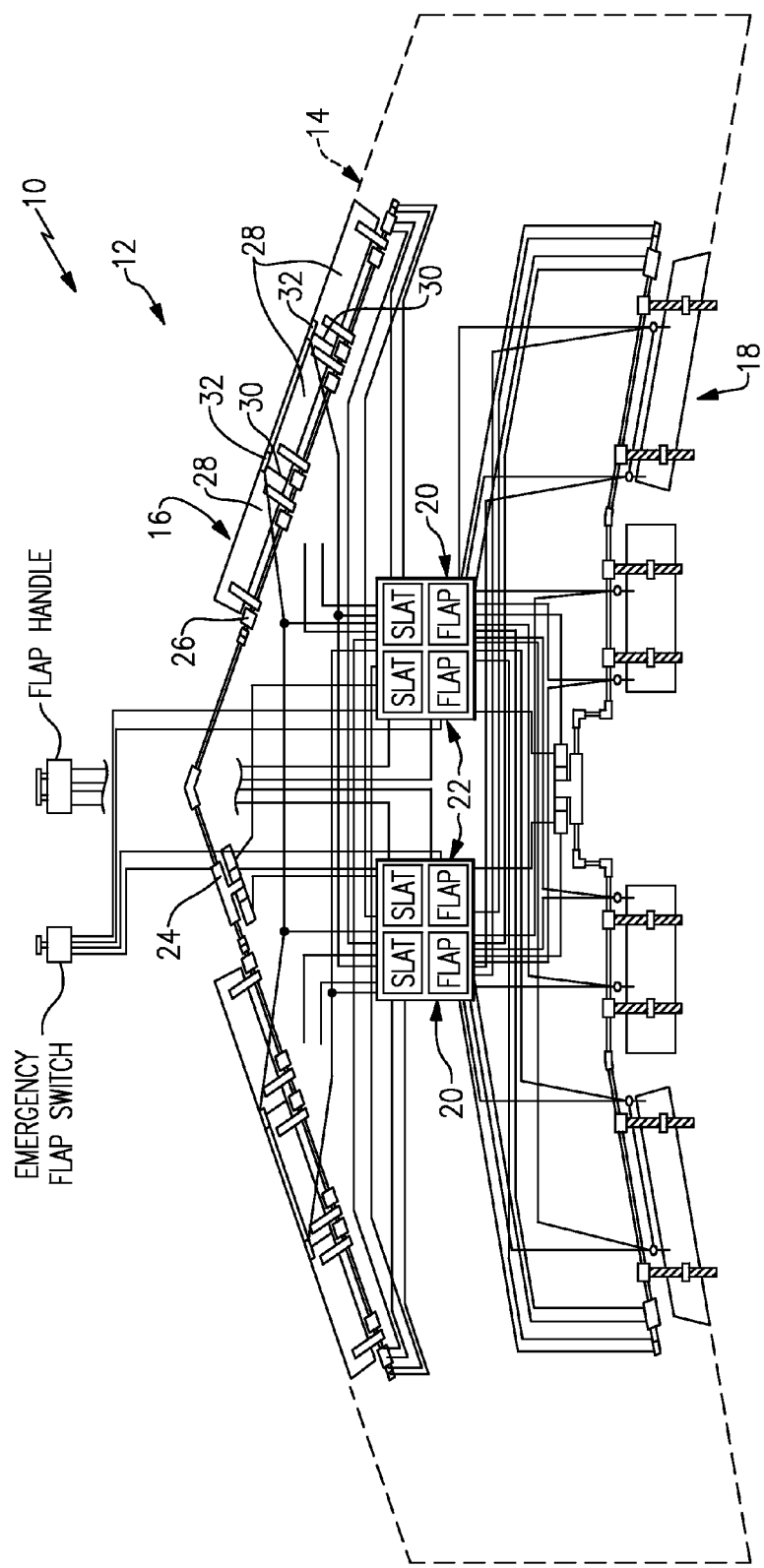
FIG. 2 is a schematic of an airfoil surface control system.

An aircraft 10 is depicted in a highly schematic fashion in FIG. 1. The aircraft 10 includes an airfoil surface control system 12 (a portion of which is also depicted in FIG. 2) for a wing 14 under the aircraft 10. The wing 14 includes slats 16 and flaps 18 that are actuated using drivers 22 and actuators 24 that are commanded by controllers 20. One or more gear boxes 26 may be provided between the drivers 22 and actuators 24.

The slats 16 include multiple slat sections 28 that are arranged adjacent to one another at joints 30 so that the slat sections 28 move in unison with one another in response to an input. During an undesired condition, one or more of the slat sections 28 may become jammed and, thus, the slats 16 are designed such that the slat sections 28 can be moved independently from one another so that complete control of the airfoil surface is not lost. To this end, one or more disconnect sensors 32 are arranged to detect the relative movement of slat sections 28 from a connect condition to a disconnect condition as a result of this undesired condition. The disconnect sensors 32 communicate a loss of electrical continuity in the disconnect condition in the example.

A first example disconnect sensor 132 is illustrated in FIGS. 4A-6A. The disconnect sensor 132 includes first and second arms 60, 62 pivotally supported by first ends 64, which provide holes 70. A base 60 having a pivot 72 for each of the first and second arms 60, 62 supports the first ends 64. Although both arms pivot in the example, another arrangement may only include one pivoting arm. A spring 74 is supported by the base 68 and arranged between the first and second arms 60, 62. Other biasing means may be used, for example, the spring may be integrated into one of the arms. A lug 76 is supported on the base 68 and provides an aperture that may be used to secure the disconnect sensor 132 to the bracket 40 (not shown). The first and second arms 60, 62 include second ends 66 opposite the first ends 64 that provide surfaces 98, which may engage with the striker pin 34 (shown in FIG. 1) during a disconnect condition.

Figure 3:
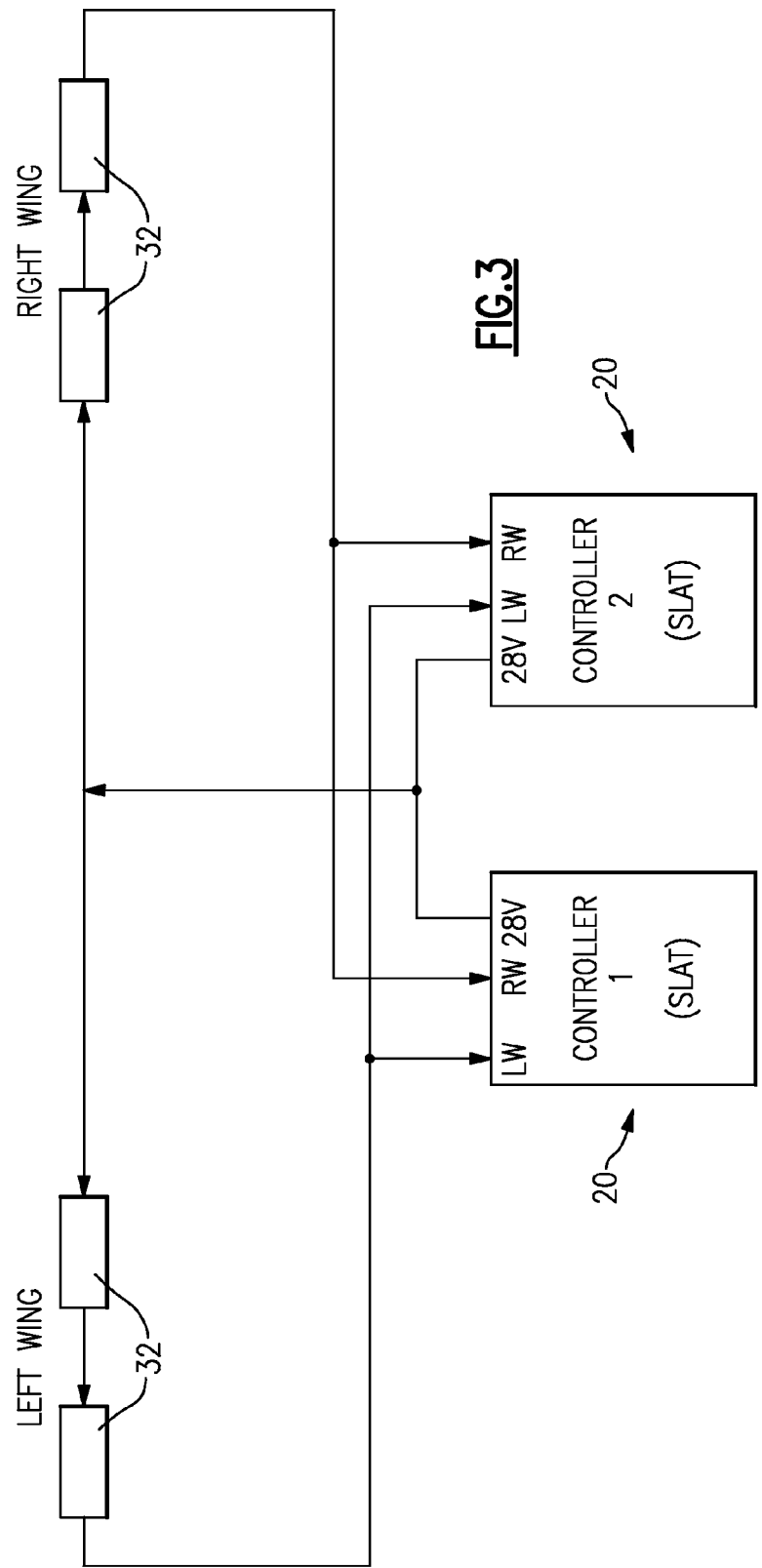
FIG. 3 is a schematic of a portion of the airfoil surface control system shown in FIG. 2.
Figure 5A:
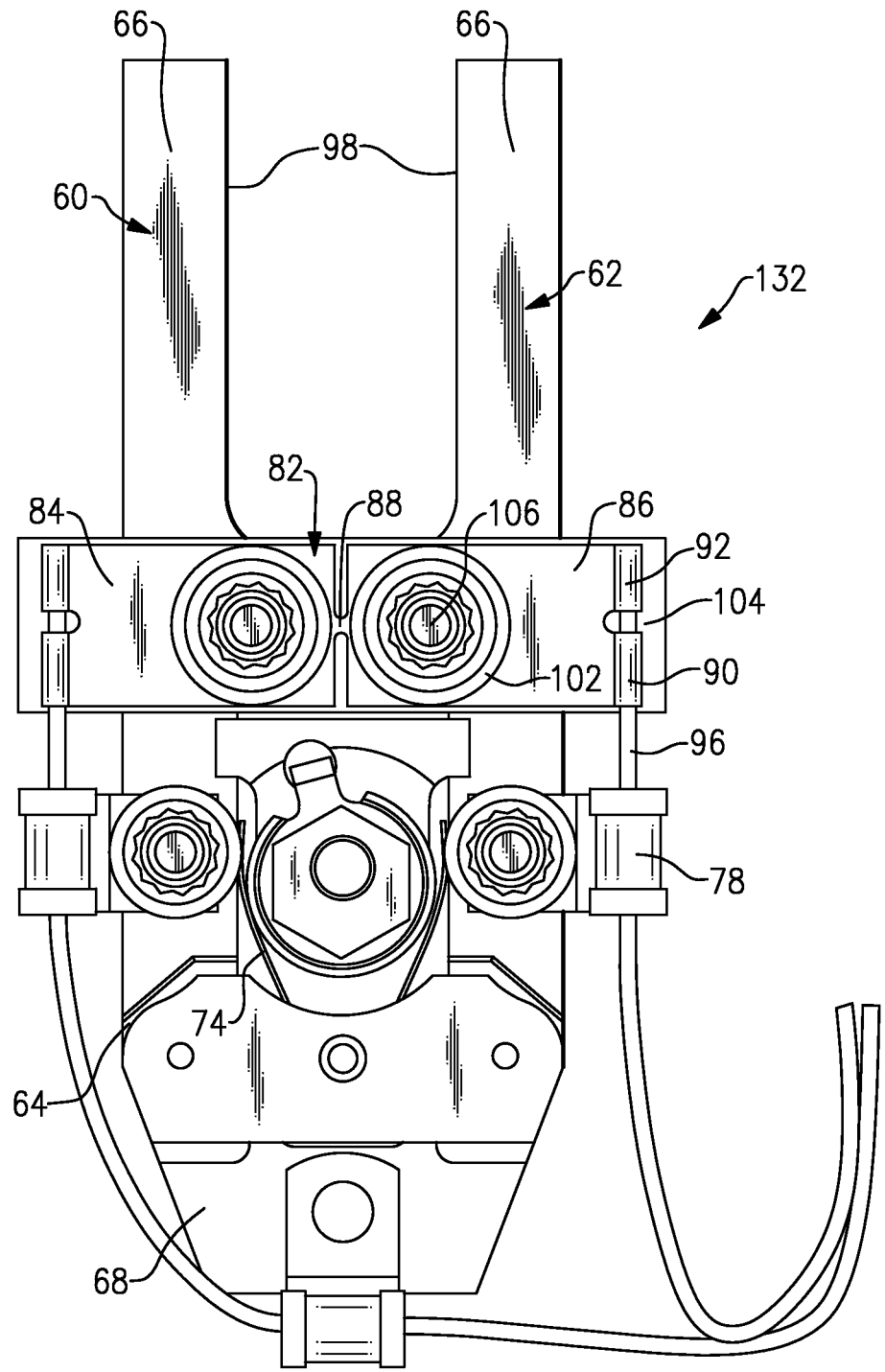
FIGS. 5A and 5B are top and side elevational views, respectively, of the first slat disconnect sensor.
Figure 5B:
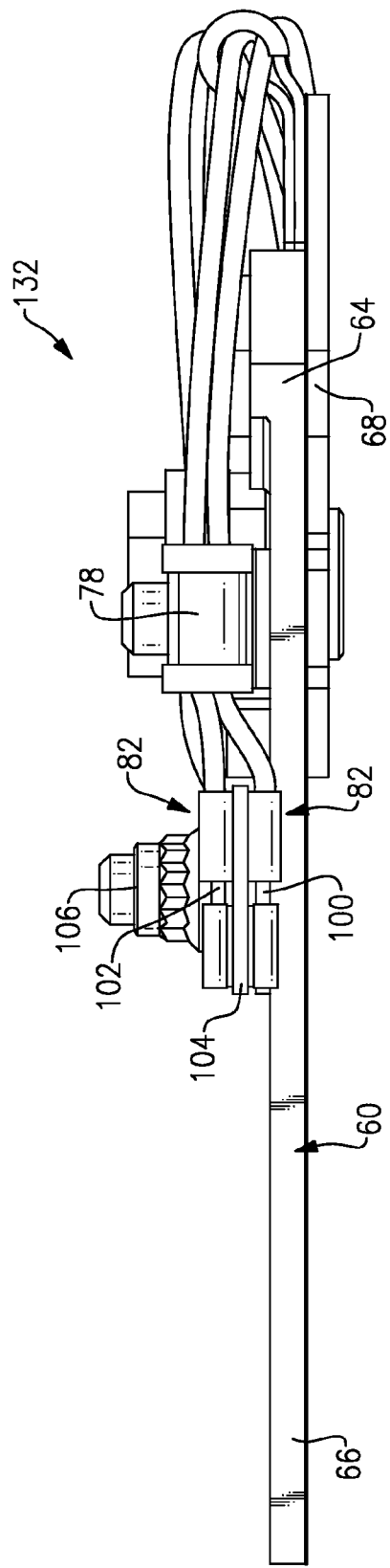

With the disconnect sensor 132, a pair of fuses 82 serve not only as a mechanical link but also as a electrical switch or fuse. While a pair of fuses 82 is illustrated, it should be understood that one or more fuses may be used. Using multiple fuses enables redundancy such that the continuity state of the fuses can be communicated to the controller(s) over multiple channels, such as by using the configuration illustrated in FIG. 3. The fuse 82 includes first and second portions 84, 86 secured to first and second arms 60, 62 respectively by a fastener 106 and interconnected by a neck 88 that provides frangible connection or weakened area that breaks during a disconnect condition. Each fastener 106 includes a stud and a nut in the example.

Wires 94 are connected to both of the first and second portions 84, 86 such that when the fuse 82 breaks at the neck 88, continuity is lost between the wires 94, which indicates that a disconnect condition has occurred. Clips 78 and fasteners 80 are used to support the wires 94 at various locations. Ends of the first and second portions 84, 86 include first and second crimps 90, 92 that respectively crimps the bare wire and wire insulation 96 of the wires 94 to provide the mechanical and electrical connection between the wires 94 and the fuse 82. The base 68 may extend in a manner so as to provide a bracket (not shown) that supports an electrical connector (not shown) connected to the wires 94.

The fuses 82 must be insulated from the first and second arms 60, 62. The fuses 82, fasteners 106 and first and second arms 60, 62 are metal. Although threaded fasteners are illustrated, other fasteners, such as rivets, may be used. To this end, first, second and third insulators 100, 102, 104 (best shown in FIG. 6A) are used to electrically insulate the fuses 82 and the fasteners 106 used to secure the first and second portions 84, 86 to the arms 60, 62 from one another. To ensure proper assembly of the disconnect sensor 132 and sufficient insulation various nesting locating features are used. The first insulator 100 includes a first collar 108 that is in close proximity to the fastener 106. The second insulator 102 includes a second collar 110 that is coaxial and in engagement with the first collar 108. The third insulator 104 includes a diameter 112 that is sufficient to accommodate the diameters of the first and second collars 108, 110. As illustrated in FIG. 4B, the first insulator 100 may be provided by two discreet sections with adjacent ends. The third insulator 104 is also illustrated as being provided by two discreet sections, however, they include a lapped joint 114 where the adjacent ends of the third insulator 104 meet.

Figure 6A:
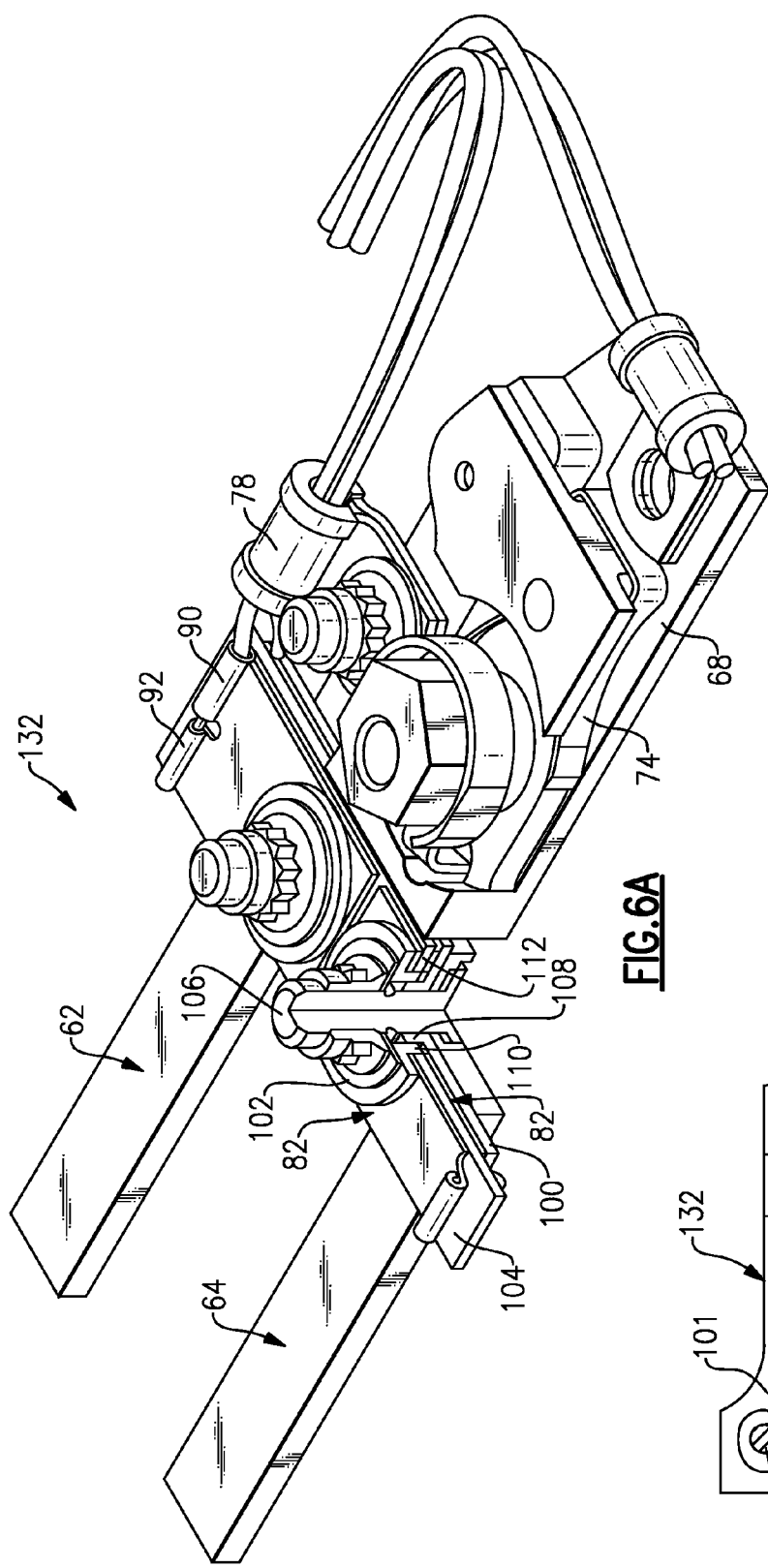
FIG. 6A is a partial cross-sectional view of the first slat disconnect sensor.
Figure 6B:
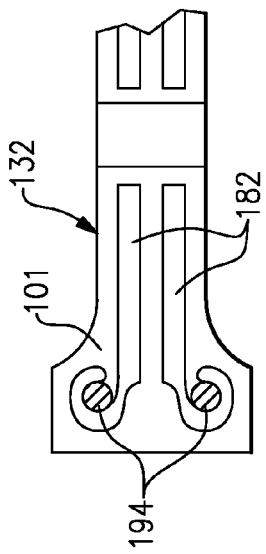
FIG. 6B is a partial cross-sectional view of another example fuse for the first slat disconnect sensor.

Another example sensor 132, shown in FIG. 6B, includes a fuse 182 encapsulated in an insulation material 101, such as PEEK. Thus, the need for discrete insulating members can be eliminated. In one example, PEEK is the same material used to insulate the wires 194.

Figure 7:
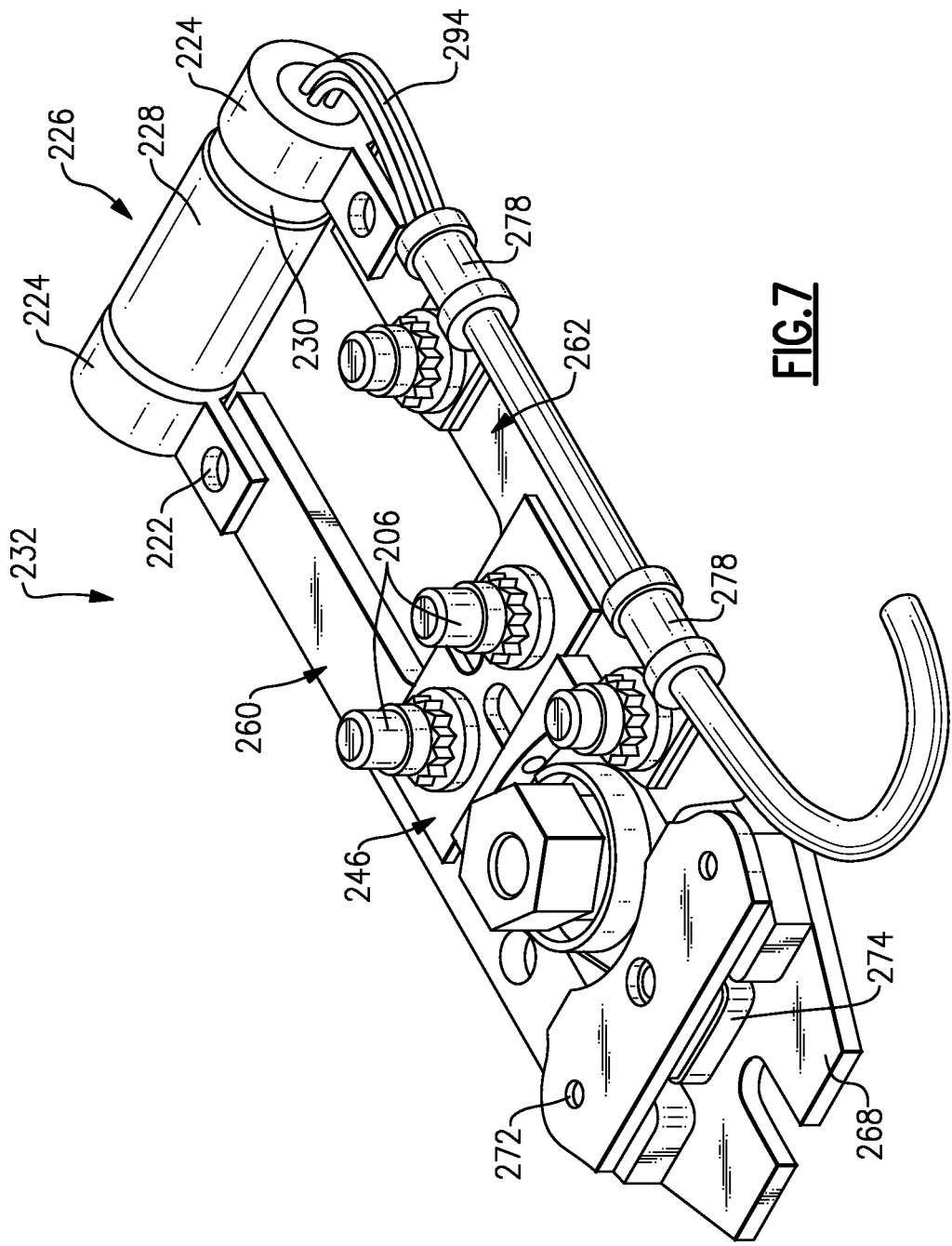
FIG. 7 is a top perspective view of a second slat disconnect sensor.
Figure 8A:
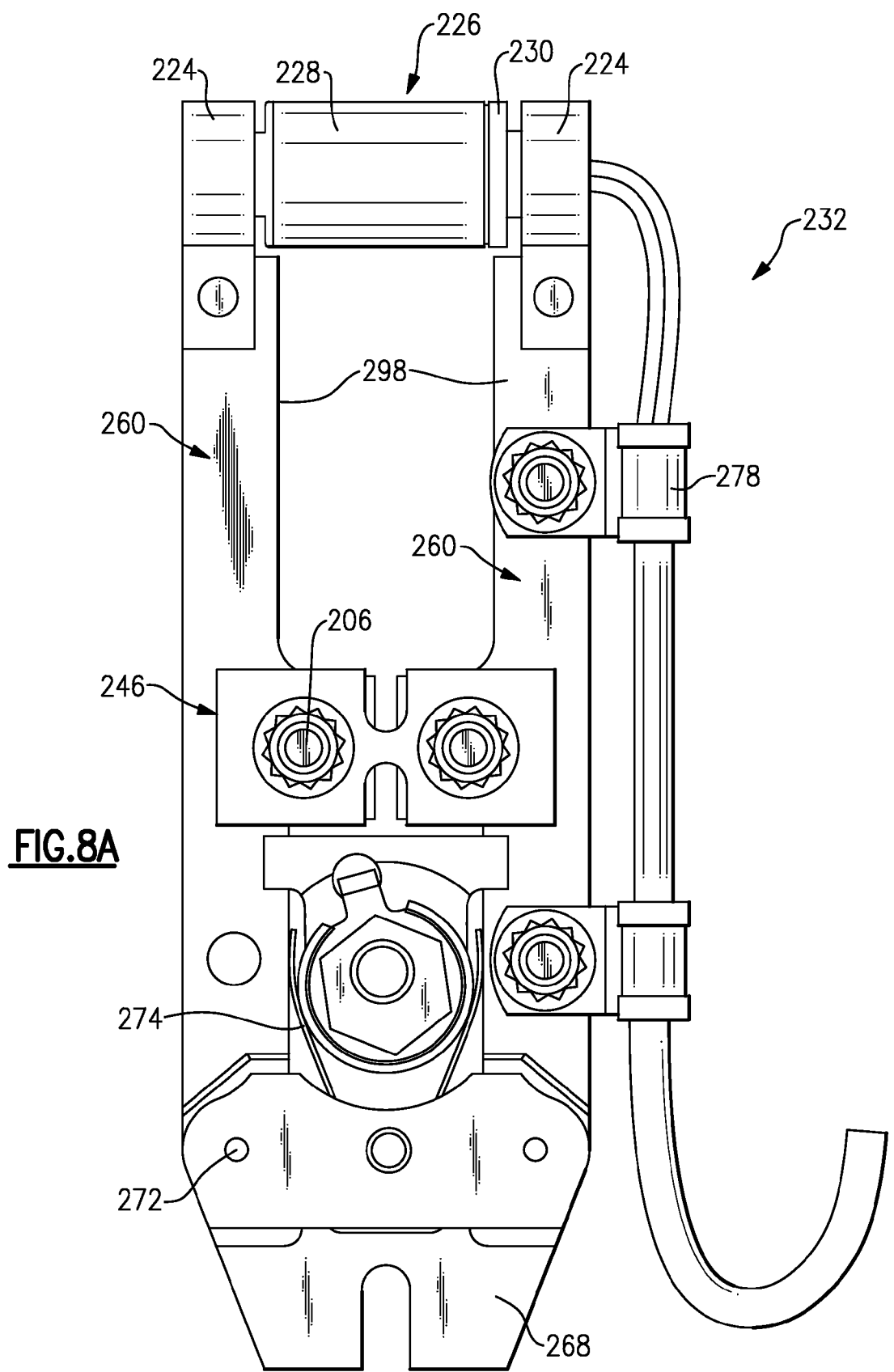
FIGS. 8A and 8B are top and side elevational views, respectively, of the second slat disconnect sensor.
Figure 8B:
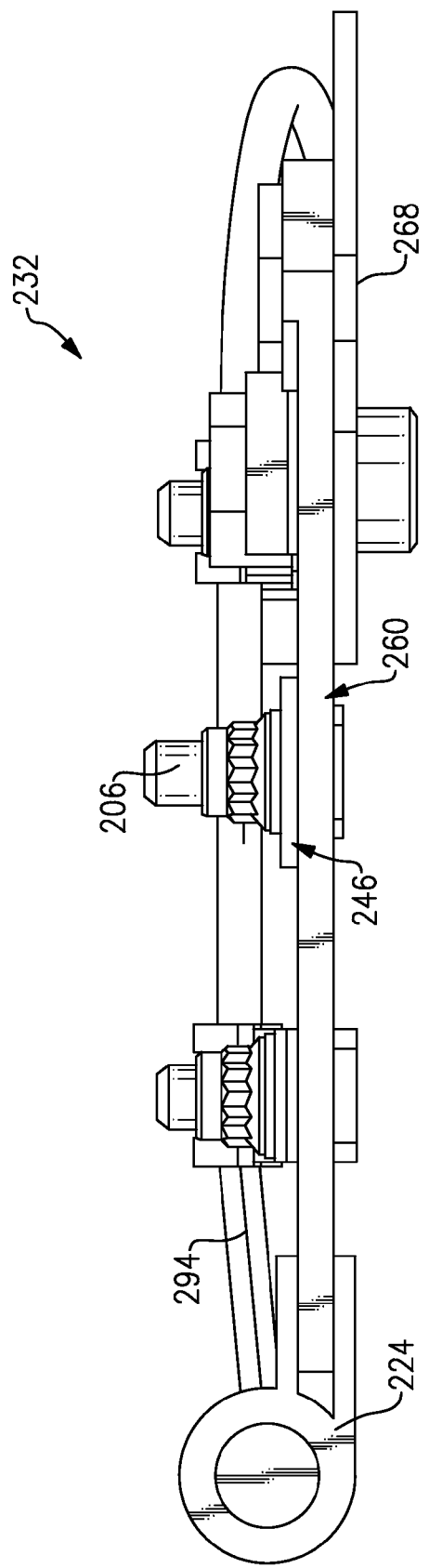
Figure 9:
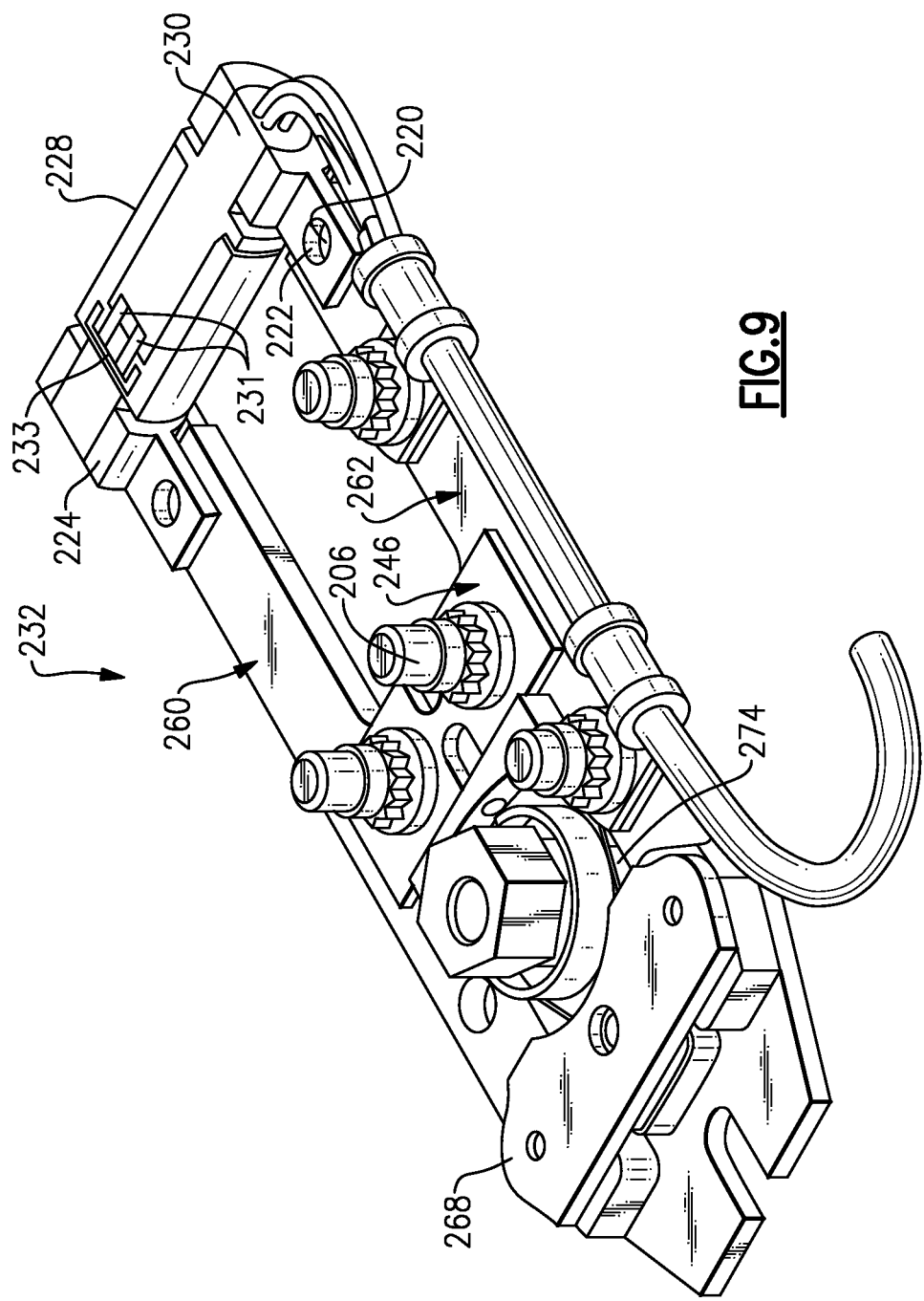
FIG. 9 is a partial cross-sectional perspective view of the second slat disconnect sensor.

Another disconnect sensor 232 is illustrated in FIGS. 7-9. Like numerals are used to indicate like elements. The disconnect sensor 232 is similar to the disconnect sensor 132 except that a mechanical link 246 is discreet from an electrical sensor 226, which senses the disconnect condition when the first and second arms 260, 262 have fractured the weakened area of the mechanical link 246. A holder 224 is mounted on each one of the first and second arms 260, 262 via fasteners (not shown) that are received in apertures 220, 222 respectively provided in the first and second arms 260, 262 and the holders 224.

The sensor 226 includes first and second portions 228, 230 that are respectively secured to a holder 224. The first and second portions 228, 230 include pins 231 and receptacles 233, for example, schematically illustrated in FIG. 9, that cooperate to electrically engage with one another to maintain continuity while the slat sections 28 move in unison with one another. During a disconnect condition the second portion 230 is pulled out of the first portion 228, which breaks electrical continuity between the pins 231 and the receptacles 233.

Although example embodiments have been disclosed, a worker of ordinary skill in this art would recognize that certain modifications would come within the scope of the claims. For that reason, the following claims should be studied to determine their true scope and content.

What is claimed is:

1. A slat disconnect sensor comprising:
   a base;
   first and second arms spaced apart from one another and operatively supported by the base, at least one of the first and second arms having an end mounted to the base and rotatable relative thereto at a pivot between connect and disconnect conditions;
   a conductive mechanical link including first and second link portions respectively secured to the first and second arms, the link interconnecting the first and second arms and including a weakened area providing a frangible connection in the connect condition and configured to break at the frangible connection in the disconnect condition; and
   a fuse including first and second fuse portions operatively mounted to the first and second arms, the fuse interconnected between the first and second arms providing continuity through the mechanical link in the connected condition, continuity broken between the first and second fuse portions in the disconnect condition wherein the first and second fuse portions are respectively the same as the first and second link portions.

2. The slat disconnect sensor according to claim 1, comprising first and second wires electrically connected respectively to the first and second fuse portions with the link providing continuity between the first and second wires in the connected condition, continuity broken between the first and second wires in the disconnect condition.

3. The slat disconnect sensor according to claim 2, wherein the first and second portions provide crimps about the first and second wires.

4. The slat disconnect sensor according to claim 1, comprising a pair of mechanical links providing a pair of fuses corresponding to first and second channels.

5. The slat disconnect sensor according to claim 1, wherein each of the first and second fuse portions are secured to the first and second arms respectively by a fastener.

6. The slat disconnect sensor according to claim 5, wherein the fuse is insulated from the first and second arms.

7. The slat disconnect sensor according to claim 6, comprising first and second insulators are respectively provided on opposing sides of the fuse and between the fuse and each fastener.

8. The slat disconnect sensor according to claim 7, wherein the first and second insulators are nested relative to one another.

9. The slat disconnect sensor according to claim 8, comprising a pair of mechanical links providing a pair of fuses corresponding to first and second channels, and a third insulator provided between the fuses.

10. The slat disconnect sensor according to claim 1, wherein the first and second arms are symmetrical with one another.

11. A slat disconnect sensor comprising:
    a base;
    first and second arms spaced apart from one another and operatively supported by the base, at least one of the first and second arms having an end mounted to the base and rotatable relative thereto at a pivot between connect and disconnect conditions;

a conductive mechanical link including first and second link portions respectively secured to the first and second arms, the link interconnecting the first and second arms and including a weakened area providing a frangible connection in the connect condition and configured to break at the frangible connection in the disconnect condition; and a fuse including first and second fuse portions operatively mounted to the first and second arms, the fuse interconnected between the first and second arms providing continuity in the connected condition, continuity broken between the first and second fuse portions in the disconnect condition, wherein the mechanical link is spaced from the fuse along the first and second arms.

12. The slat disconnect sensor according to claim 11, wherein the first and second fuse portions respectively correspond to a pin and a receptacle that engagingly cooperate with one another to maintain continuity in the connect condition.

13. The slat disconnect sensor according to claim 12, wherein the mechanical link is in engagement with the first and second arms.

14. A method of manufacturing a slat disconnect sensor comprising:

encapsulating an electrically conductive element in an insulation material to provide a fuse including a weakened area;

securing the fuse between spaced apart arms pivotally supported relative to a base; and providing continuity across the fuse in a connect condition.

* * * * *